United States Patent
Guo et al.

(10) Patent No.: US 12,219,430 B2
(45) Date of Patent: Feb. 4, 2025

(54) POSITIONING METHOD, DEVICE, SYSTEM, CHIP, AND STORAGE MEDIUM

(71) Applicant: HUAWEI TECHNOLOGIES CO., LTD., Shenzhen (CN)

(72) Inventors: Shaonan Guo, Chengdu (CN); Jianping Li, Chengdu (CN); Bailu Wang, Shenzhen (CN); Fangyang Fu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 17/704,536

(22) Filed: Mar. 25, 2022

(65) Prior Publication Data

US 2022/0217503 A1 Jul. 7, 2022

Related U.S. Application Data

(63) Continuation of application No. PCT/CN2019/108286, filed on Sep. 26, 2019.

(51) Int. Cl.
*H04W 64/00* (2009.01)
*G01S 5/02* (2010.01)
*H04W 4/029* (2018.01)

(52) U.S. Cl.
CPC ........... *H04W 4/029* (2018.02); *G01S 5/0268* (2013.01)

(58) Field of Classification Search
None
See application file for complete search history.

(56) References Cited

U.S. PATENT DOCUMENTS

| | | | |
|---|---|---|---|
| 2011/0124347 A1 | 5/2011 | Chen et al. | |
| 2014/0120947 A1* | 5/2014 | Siomina | G01S 5/02213 455/456.1 |
| 2019/0261137 A1 | 8/2019 | Markhovsky et al. | |

FOREIGN PATENT DOCUMENTS

| | | |
|---|---|---|
| CN | 1844948 A | 10/2006 |
| CN | 106900056 A | 6/2017 |
| CN | 108702726 A | 10/2018 |

OTHER PUBLICATIONS

Extended European Search Report issued in corresponding European Application No. 19947124.4, dated Aug. 25, 2022, pp. 1-7.
International Search Report issued in corresponding International Application No. PCT/CN2019/108286, dated Jun. 28, 2020, pp. 1-9.

\* cited by examiner

*Primary Examiner* — Willie J Daniel, Jr.
(74) *Attorney, Agent, or Firm* — HAUPTMAN HAM, LLP

(57) ABSTRACT

A positioning method, a device, a system, a chip, and a storage medium are provided. A network device is externally connected to N antennas, the network device has N receive channels, and the N antennas are in a one-to-one correspondence with the N receive channels. The method includes: A network device receives, by using each of the N antennas, a positioning signal sent by a terminal device, determines TOA information and/or RSSI information of the positioning signal on each of the N receive channels, and sends the TOA information and/or the RSSI information of the positioning signal on each of the N receive channels to a service anchor. The service anchor is configured to position the terminal device based on the TOA information and/or the RSSI information.

10 Claims, 15 Drawing Sheets

POSITIONING METHOD, DEVICE, SYSTEM, CHIP, AND STORAGE MEDIUM

CROSS-REFERENCE TO RELATED APPLICATIONS

This application is a continuation of International Application No. PCT/CN2019/108286, filed on Sep. 26, 2019, which is hereby incorporated by reference in its entirety.

TECHNICAL FIELD

This application relates to the field of communications technologies, and in particular, to a positioning method, a device, a system, a chip, and a storage medium.

BACKGROUND

Currently, global positioning system (Global Positioning System)-based positioning technologies are widely used. However, in an indoor scenario, a GPS satellite signal is very weak because of occlusion and the like, and consequently positioning performance is relatively poor. A fourth-generation (4 Generation, 4G) mobile communications system/a fifth-generation (5 Generation, 5G) mobile communications system greatly promotes popularization of indoor base stations, and provides rich infrastructure for high-precision indoor positioning.

Currently, a positioning method of an indoor base station is based on a scenario including a plurality of base stations. For example, in an angle of arrival (Angle of Arrival, AOA)-based positioning technology, a plurality of base stations first separately receive a radio wave signal transmitted by a terminal device, to obtain angle information of the radio wave signal, and then estimate a location of the terminal device by using an intersection method. The positioning method implemented based on the scenario including the plurality of base stations is characterized by the following: A larger quantity of base stations indicates easier implementation of a positioning solution. However, because of a problem such as costs, most indoor scenarios cannot ensure that a plurality of base stations are provided at the same time within same coverage, resulting in limited application of a multi-station joint positioning method.

SUMMARY

This application provides a positioning method, a device, a system, a chip, and a storage medium. This reduces costs, and adapts to most indoor scenarios, so that a multi-station joint positioning method is more widely applied.

According to a first aspect, this application provides a positioning method. The method is applied to a network device, the network device is externally connected to N antennas, the network device has N receive channels, the N antennas are in a one-to-one correspondence with the N receive channels, and N is an integer greater than or equal to 3. The method includes: receiving, by using each of the N antennas, a positioning signal sent by a terminal device; determining TOA information and/or RSSI information of the positioning signal on each of the N receive channels; and sending the TOA information and/or the RSSI information of the positioning signal on each of the N receive channels to a service anchor, where the TOA information and/or the RSSI information of the positioning signal on each of the N receive channels are/is used to position the terminal device. That is, in this application, there is no need to use a plurality of network devices, but the network device is externally connected to the N antennas. Therefore, the terminal device can be positioned. This reduces costs, and adapts to most indoor scenarios, so that a multi-station joint positioning method is more widely applied.

Optionally, the network device further includes N transmit channels, the N transmit channels are in a one-to-one correspondence with the N receive channels, and before the determining TOA information of the positioning signal on each of the N receive channels, the method further includes: transmitting a first synchronization signal through a first transmit channel, where the first transmit channel is any one of the N transmit channels; receiving the first synchronization signal through a first receive channel group, where the first receive channel group includes N−1 receive channels in the N receive channels other than a receive channel corresponding to the first transmit channel; determining TOA information of the first synchronization signal on the first receive channel group, and sending the TOA information of the first synchronization signal on the first receive channel group to the service anchor, where the TOA information of the first synchronization signal on the first receive channel group is used to implement time synchronization in the first receive channel group; transmitting a second synchronization signal through a second transmit channel, where the second transmit channel is any one of the N transmit channels other than the first transmit channel; receiving the second synchronization signal through a second receive channel group, where the second receive channel group includes N−1 receive channels in the N receive channels other than a receive channel corresponding to the second transmit channel; and determining TOA information of the second synchronization signal on the second receive channel group, and sending the TOA information of the second synchronization signal on the second receive channel group to the service anchor, where the TOA information of the second synchronization signal on the second receive channel group is used to implement time synchronization in the second receive channel group. In the foregoing manner, time synchronization between receive channels can be implemented, and TOA information obtained based on the foregoing manner is more accurate, thereby improving positioning accuracy of the terminal device.

The following provides a positioning method performed on a service anchor side, a network device, a service anchor, a chip, a storage medium, and a computer program product. For effects thereof, refer to the effects corresponding to the positioning method. Details are not described herein again.

According to a second aspect, this application provides a positioning method. The method is applied to a service anchor, and the method includes: receiving TOA information and/or RSSI information, on each of N receive channels, of a positioning signal sent by a network device; and positioning a terminal device based on the TOA information and/or the RSSI information of the positioning signal on each of the N receive channels, where the network device is externally connected to N antennas, the network device has N receive channels, the N antennas are in a one-to-one correspondence with the N receive channels, N is an integer greater than or equal to 3, and the positioning signal is sent by the network device by using the N antennas.

Optionally, the positioning a terminal device based on the TOA information and/or the RSSI information of the positioning signal on each of the N receive channels includes: determining time difference of arrival TDOA information of the positioning signal between the N receive channels based on the TOA information of the positioning signal on each of the N receive channels, to position the terminal device; or performing circle positioning on the terminal device based on the RSSI information of the positioning signal on each of the N receive channels.

Optionally, the positioning a terminal device based on the TOA information and/or the RSSI information of the positioning signal on each of the N receive channels includes: determining time difference of arrival TDOA information of the positioning signal between the N receive channels based on the TOA information of the positioning signal on each of the N receive channels, to position the terminal device to obtain first positioning information; or performing circle positioning on the terminal device based on the RSSI information of the positioning signal on each of the N receive channels, to obtain second positioning information; and determining final positioning information of the terminal device based on the first positioning information and the second positioning information.

Optionally, the method further includes: receiving TOA information, on a first receive channel group, of a first synchronization signal sent by the network device, where the network device further includes N transmit channels, the N transmit channels are in a one-to-one correspondence with the N receive channels, the first synchronization signal is sent by the network device through a first transmit channel, the first transmit channel is any one of the N transmit channels, and the first receive channel group includes N−1 receive channels in the N receive channels other than a receive channel corresponding to the first transmit channel; performing time synchronization in the first receive channel group based on the TOA information of the first synchronization signal on the first receive channel group; receiving TOA information, on a second receive channel group, of a second synchronization signal sent by the network device, where the second synchronization signal is sent by the network device through a second transmit channel, the second transmit channel is any one of the N transmit channels other than the first transmit channel, and the second receive channel group includes N−1 receive channels in the N receive channels other than a receive channel corresponding to the second transmit channel; and performing time synchronization in the second receive channel group based on the TOA information of the second synchronization signal on the second receive channel group.

According to a third aspect, this application provides a positioning method. The method is applied to a network device, the network device is externally connected to N antennas, the network device has N receive channels, the N antennas are in a one-to-one correspondence with the N receive channels, and N is an integer greater than or equal to 3. The method includes: receiving, by using each of the N antennas, a positioning signal sent by a terminal device; determining time of arrival TOA information and/or received signal strength indicator RSSI information of the positioning signal on each of the N receive channels; and positioning the terminal device based on the TOA information and/or the RSSI information of the positioning signal on each of the N receive channels.

Optionally, the network device further includes N transmit channels, the N transmit channels are in a one-to-one correspondence with the N receive channels, and before the determining TOA information of the positioning signal on each of the N receive channels, the method further includes: transmitting a first synchronization signal through a first transmit channel, where the first transmit channel is any one of the N transmit channels; receiving the first synchronization signal through a first receive channel group, where the first receive channel group includes N−1 receive channels in the N receive channels other than a receive channel corresponding to the first transmit channel; determining TOA information of the first synchronization signal on the first receive channel group, and performing time synchronization in the first receive channel group based on the TOA information of the first synchronization signal on the first receive channel group; transmitting a second synchronization signal through a second transmit channel, where the second transmit channel is any one of the N transmit channels other than the first transmit channel; receiving the second synchronization signal through a second receive channel group, where the second receive channel group includes N−1 receive channels in the N receive channels other than a receive channel corresponding to the second transmit channel; and determining TOA information of the second synchronization signal on the second receive channel group, and performing time synchronization in the second receive channel group based on the TOA information of the second synchronization signal on the second receive channel group.

Optionally, the positioning a terminal device based on the TOA information and/or the RSSI information of the positioning signal on each of the N receive channels includes: determining time difference of arrival TDOA information of the positioning signal between the N receive channels based on the TOA information of the positioning signal on each of the N receive channels, to position the terminal device; or performing circle positioning on the terminal device based on the RSSI information of the positioning signal on each of the N receive channels.

Optionally, the positioning a terminal device based on the TOA information and/or the RSSI information of the positioning signal on each of the N receive channels includes: determining time difference of arrival TDOA information of the positioning signal between the N receive channels based on the TOA information of the positioning signal on each of the N receive channels, to position the terminal device to obtain first positioning information; or performing circle positioning on the terminal device based on the RSSI information of the positioning signal on each of the N receive channels, to obtain second positioning information; and determining final positioning information of the terminal device based on the first positioning information and the second positioning information.

According to a fourth aspect, this application provides a network device. The network device is externally connected to N antennas, the network device has N receive channels, the N antennas are in a one-to-one correspondence with the N receive channels, and N is an integer greater than or equal to 3. The network device includes:
  a first receiving module, configured to receive, by using each of the N antennas, a positioning signal sent by a terminal device;
  a first determining module, configured to determine time of arrival TOA information and/or received signal strength indicator RSSI information of the positioning signal on each of the N receive channels; and
  a first sending module, configured to send the TOA information and/or the RSSI information of the positioning signal on each of the N receive channels to a service anchor, where
  the TOA information and/or the RSSI information of the positioning signal on each of the N receive channels are/is used to position the terminal device.

According to a fifth aspect, this application provides a service anchor, including:
- a first receiving module, configured to receive TOA information and/or RSSI information, on each of N receive channels, of a positioning signal sent by a network device; and
- a positioning module, configured to position a terminal device based on the TOA information and/or the RSSI information of the positioning signal on each of the N receive channels, where
- the network device is externally connected to N antennas, the network device has N receive channels, the N antennas are in a one-to-one correspondence with the N receive channels, N is an integer greater than or equal to 3, and the positioning signal is sent by the network device by using the N antennas.

According to a sixth aspect, this application provides a network device. The network device is externally connected to N antennas, the network device has N receive channels, the N antennas are in a one-to-one correspondence with the N receive channels, and N is an integer greater than or equal to 3. The network device includes:
- a first receiving module, configured to receive, by using each of the N antennas, a positioning signal sent by a terminal device;
- a first determining module, configured to determine time of arrival TOA information and/or received signal strength indicator RSSI information of the positioning signal on each of the N receive channels; and
- a positioning module, configured to position the terminal device based on the TOA information and/or the RSSI information of the positioning signal on each of the N receive channels.

According to a seventh aspect, this application provides a network device, including a memory and a processor. The memory is configured to store computer instructions, so that the processor executes the computer instructions, to implement the positioning method in the first aspect or the optional manners of the first aspect.

According to an eighth aspect, this application provides a service anchor, including a memory and a processor. The memory is configured to store computer instructions, so that the processor executes the computer instructions, to implement the positioning method in the second aspect or the optional manners of the second aspect.

According to a ninth aspect, this application provides a positioning system, including the network device in the seventh aspect and N antennas externally connected to the network device, where N is an integer greater than or equal to 3.

According to a tenth aspect, this application provides a network device, including a memory and a processor. The memory is configured to store computer instructions, so that the processor executes the computer instructions, to implement the positioning method in the third aspect or the optional manners of the third aspect.

According to a twelfth aspect, this application provides a chip. The chip is configured to implement the positioning method in any one of the foregoing aspects.

According to a thirteenth aspect, this application provides a computer storage medium, including computer executable instructions. The computer executable instructions are used to implement the positioning method in any one of the foregoing aspects.

According to a fourteenth aspect, this application provides a computer program product, including computer executable instructions. The computer executable instructions are used to implement the positioning method in any one of the foregoing aspects.

According to a fifteenth aspect, this application provides a positioning method, including: A network device receives, by using N antennas, positioning signals sent by a terminal device, and performs delay processing on each positioning signal, to ensure that the network device can distinguish between the N positioning signals after combining the N positioning signals. A positioning signal finally obtained after the combination processing is transmitted to a PRRU, and the PRRU determines TOA information of each of the N positioning signals. The TOA information is transmitted to an RHUB, and the RHUB transparently transmits the TOA information to a BBU. The BBU transparently transmits the TOA information to an SVA, and the SVA determines TDOA information between the N positioning signals based on the TOA information, to position the terminal device.

According to a sixteenth aspect, this application provides a positioning method, including: separately processing positioning signals received from receive channels corresponding to N radio frequency channels, and performing subcarrier or RB frequency shift on processed positioning signals, to ensure that a network device can distinguish between the N positioning signals after combining the N positioning signals. Then, intermediate frequency processing is performed on the positioning signals on which frequency shift is performed, and processed positioning signals are transmitted to an RHUB. The RHUB combines the N positioning signals, and transmits a combined positioning signal to a BBU. The BBU first splits the combined positioning signal in frequency domain to obtain N positioning signals, determines TOA information of the N positioning signals by using the foregoing super-resolution algorithm, and transmits the TOA information to an SVA. The SVA determines TDOA information between the N positioning signals based on the TOA information, to position a terminal device.

In conclusion, this application provides a positioning method, a device, a system, a chip, and a storage medium. A network device is externally connected to N antennas, the network device has N receive channels, and the N antennas are in a one-to-one correspondence with the N receive channels. The network device receives, by using each of the N antennas, a positioning signal sent by a terminal device, determines TOA information and/or RSSI information of the positioning signal on each of the N receive channels; and sends the TOA information and/or the RSSI information of the positioning signal on each of the N receive channels to a service anchor. The service anchor is configured to position the terminal device based on the TOA information and/or the RSSI information. Alternatively, the network device is configured to position the terminal device based on the TOA information and/or the RSSI information. This reduces costs, and adapts to most indoor scenarios, so that a multi-station joint positioning method is more widely applied.

DESCRIPTION OF EMBODIMENTS

As described above, a positioning method of an indoor base station is based on a scenario including a plurality of base stations. However, because of a problem such as costs, most indoor scenarios cannot ensure that a plurality of base stations are provided at the same time within same coverage, resulting in limited application of a multi-station joint positioning method. To resolve the foregoing technical problem, this application provides a positioning method, a device, a system, a chip, and a storage medium.

Figure 1:
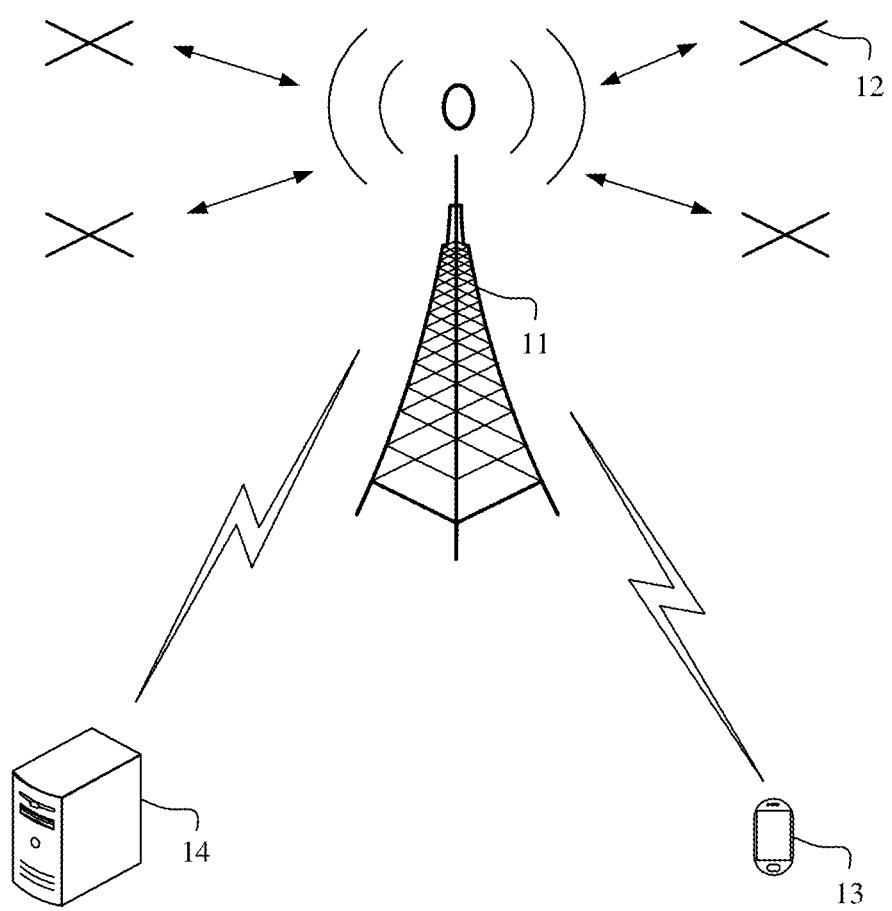
FIG. 1 is a diagram of an application scenario of a technical solution in this application according to an embodiment of this application.

For example, FIG. 1 is a diagram of an application scenario of a technical solution in this application according to an embodiment of this application. As shown in FIG. 1, a network device 11 may be externally connected to N antennas 12, and N is an integer greater than or equal to 3. An example in which the network device 11 is externally connected to four antennas is used in FIG. 1. Further, the technical solution in this application further relates to network elements: a terminal device 13 and a service anchor (Service Anchor, SVA) 14. The terminal device 13 may communicate with the network device 11 by using the N antennas 12, and the network device 11 and the SVA 14 may transmit data to each other through wireless communication. It should be noted that an example in which one terminal device 13 accesses one network device 11 is used in FIG. 1. Actually, one terminal device 13 may alternatively access a plurality of network devices. This is not limited in this application. In addition, a name of the service anchor 14 is not limited to the SVA, and any device that has a similar function to the SVA may be used as the service anchor.

Figure 2:
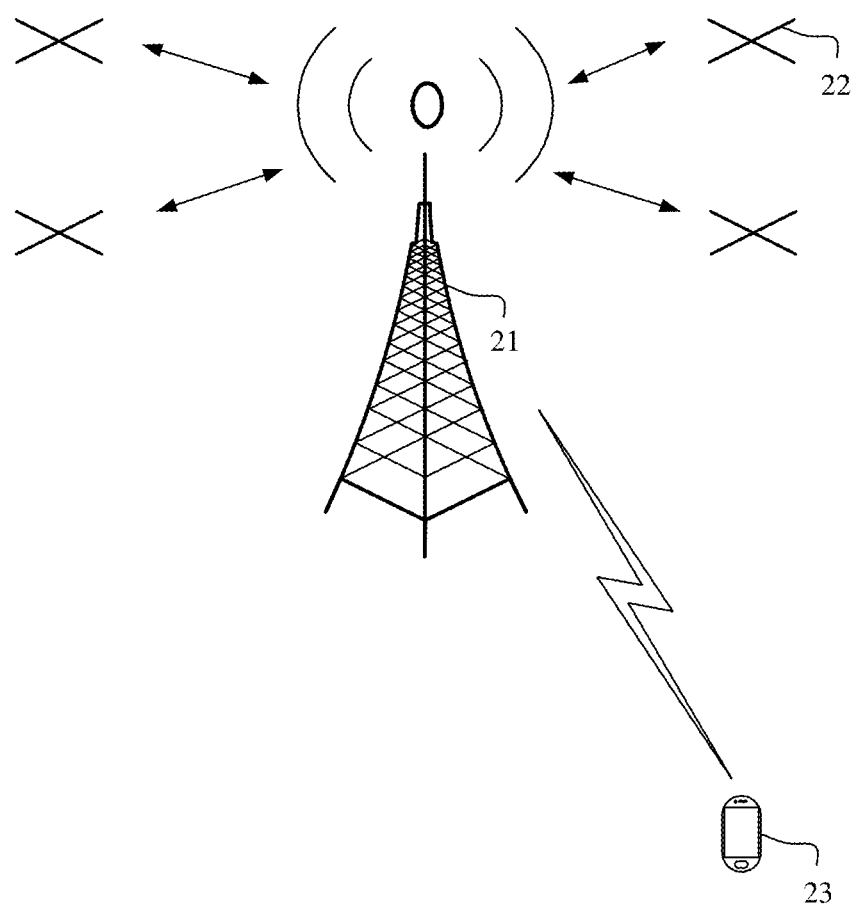
FIG. 2 is a diagram of an application scenario of a technical solution in this application according to another embodiment of this application.

For example, FIG. 2 is a diagram of an application scenario of a technical solution in this application according to another embodiment of this application. As shown in FIG. 2, a network device 21 may be externally connected to N antennas 22, and N is an integer greater than or equal to 3. An example in which the network device 21 is externally connected to four antennas is used in FIG. 2. Further, the technical solution in this application further relates to a network element: a terminal device 23. The terminal device 23 may communicate with the network device 21 by using the N antennas 22. It should be noted that an example in which one terminal device 23 accesses one network device 21 is used in FIG. 2. Actually, one terminal device 23 may alternatively access a plurality of network devices. This is not limited in this application.

The network device in this application may be a base transceiver station (Base Transceiver Station, BTS) in a global system for mobile communications (Global System of Mobile communication, GSM) or code division multiple access (Code Division Multiple Access, CDMA), or may be a NodeB (NodeB, NB) in wideband code division multiple access (Wideband Code Division Multiple Access, WCDMA), or may be an evolved NodeB (evolved NodeB, eNB) or a next-generation evolved NodeB (next-generation evolved NodeB, ng-eNB) in long term evolution (Long Term Evolution, LTE) or evolved long term evolution (evolved Long Term Evolution, eLTE), or may be an access point (Access Point, AP) or a relay station in a wireless local area network (Wireless Local Area Network, WLAN), or may be a gNB in 5G new radio (New Radio, NR). This is not limited herein.

In addition, the terminal device in this application may be a device that provides a user with voice and/or data connectivity, a handheld device with a radio connection function, or another processing device connected to a radio modem. The terminal device may communicate with at least one core network via a radio access network (Radio Access Network, RAN). The terminal device may be a mobile terminal, for example, a mobile phone (or referred to as a "cellular" phone) or a computer that has a mobile terminal. For example, the terminal device may be a portable, pocket-size, handheld, computer built-in or vehicle-mounted mobile apparatus, which exchanges voice and/or data with the radio access network. The terminal device may also be referred to as a subscriber unit (Subscriber Unit), a subscriber station (Subscriber Station), a mobile station (Mobile Station), a remote station (Remote Station), an access point (Access Point), a remote terminal (Remote Terminal), an access terminal (Access Terminal), a user terminal (User Terminal), a user agent (User Agent), or user equipment (User Equipment). This is not limited herein.

The antenna in this application may be an omnidirectional antenna, a directional antenna, an array antenna, or the like. This is not limited herein.

Figure 3:
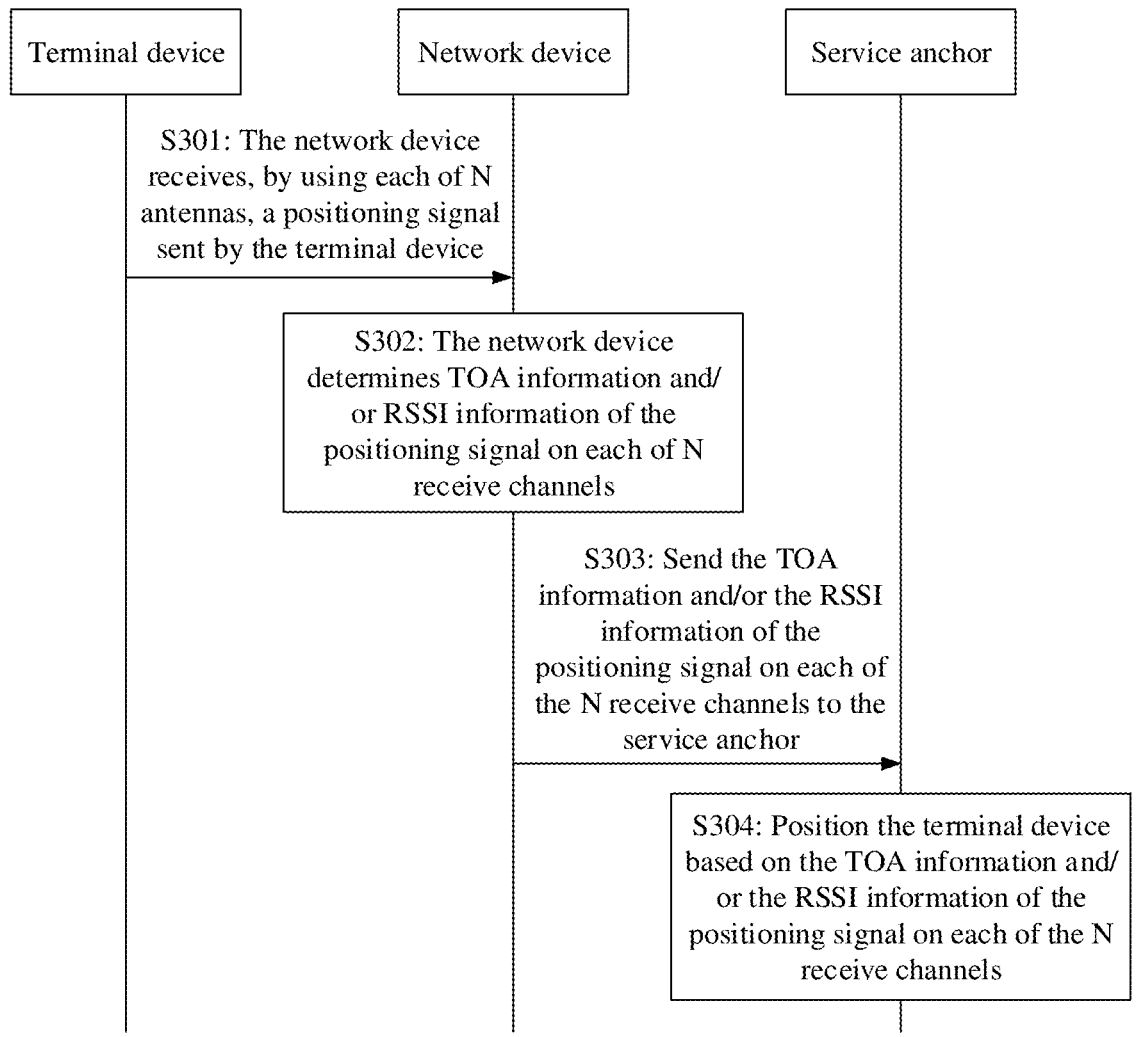
FIG. 3 is an interactive flowchart of a positioning method according to an embodiment of this application.

FIG. 3 is an interactive flowchart of a positioning method according to an embodiment of this application. Network elements in the method include a network device, a terminal device, and a service anchor. For example, with reference to the diagram of the scenario shown in FIG. 1, the network device is externally connected to N antennas, the network device has N receive channels, the N antennas are in a one-to-one correspondence with the N receive channels, and N is an integer greater than or equal to 3. As shown in FIG. 3, the method includes the following steps.

Step S301: The network device receives, by using each of N antennas, a positioning signal sent by the terminal device.

Step S302: The network device determines time of arrival (Time of arrival, TOA) information and/or received signal strength indicator (Received Signal Strength Indicator, RSSI) information of the positioning signal on each of the N receive channels.

Step S303: The network device sends the TOA information and/or the RSSI information of the positioning signal on each of the N receive channels to the service anchor.

Step S304: The service anchor positions the terminal device based on the TOA information and/or the RSSI information of the positioning signal on each of the N receive channels.

The positioning signal sent by the terminal device is used to position the terminal device.

Case 1: The network device may determine the TOA information of the positioning signal on each of the N receive channels.

Case 2: The network device may determine the RSSI information of the positioning signal on each of the N receive channels.

Case 3: The network device may determine the TOA information and the RSSI information of the positioning signal on each of the N receive channels.

For example, the network device may determine the TOA information of the positioning signal on each of the N receive channels by using a super-resolution algorithm. The super-resolution algorithm is also referred to as a super-resolution TOA estimation algorithm. A process of the algorithm is as follows: The network device receives a positioning signal on any one of the N receive channels, and takes an $n^{th}$ snapshot of the positioning signal to obtain Sig_Rx0(n). Sig_Rx0(n) may be converted into that in frequency domain through fast Fourier transform (Fast Fourier Transform, FFT) to obtain a frequency domain receive signal Sig_freq_domain_Rx0(n), and Sig_freq_domain_Rx0(n) is conjugated with a local reference signal Sig_Ref(n) to obtain a frequency domain channel response H_Rx0(n).

That is, H_Rx0(n)=Sig_freq_domain_Rx0(n) x conj(Sig_Ref(n)), where conj( ) represents a conjugate operation.

The network device may construct a covariance matrix R by using a formula (1):

$$R = \frac{1}{P}\sum_{n=1}^{P} H\_Rx0(n) * H\_Rx0(n)^{H}. \quad (1)$$

P is a quantity of snapshots taken by the network device of the positioning signal on any one of the foregoing receive channels. H_Rx0(n)$^H$ represents conjugate transposition on H_Rx0(n).

Further, the network device performs EVD eigenvalue decomposition on R to obtain an eigenvalue and an eigenvector corresponding to each eigenvalue. Assuming that a steering vector is that $v(\tau)=[1, e^{-j2\pi\Delta f\tau}, \ldots e^{-j2\pi(L-1)\Delta f\tau}]^T$, the network device performs MUSIC pseudo-spectrum calculation by using a formula (2):

$$S(\tau) = \frac{1}{\sum_{k=LP}^{L-1} |q_k^H v(\tau)|^2}$$

An $i^{th}$ element in v(τ) is $e^{-j2\pi i\Delta f\tau}$, where i=1, 2 . . . L−1. Δf is a subcarrier spacing, τ is a sampling time for a timing signal, L is a dimension of the covariance matrix R, LP is a quantity of sources, and $q_k^H$ is a result of conjugate transposition on an eigenvector $q_k$. Further, the network device may perform summit search on S(τ), and select a first summit greater than a preset threshold as a TOA of the positioning signal on any one of the foregoing receive channels. It should be noted that this application sets no limitation on a manner of determining the TOA of the positioning signal on the receive channel.

After obtaining the TOA information of the positioning signal on each of the N receive channels, the network device may send the TOA information of the positioning signal on each of the N receive channels to the service anchor. The service anchor may determine time difference of arrival (Time difference of arrival, TDOA) information of the positioning signal between the N receive channels based on the TOA information of the positioning signal on each of the N receive channels, to position the terminal device.

Figure 4:
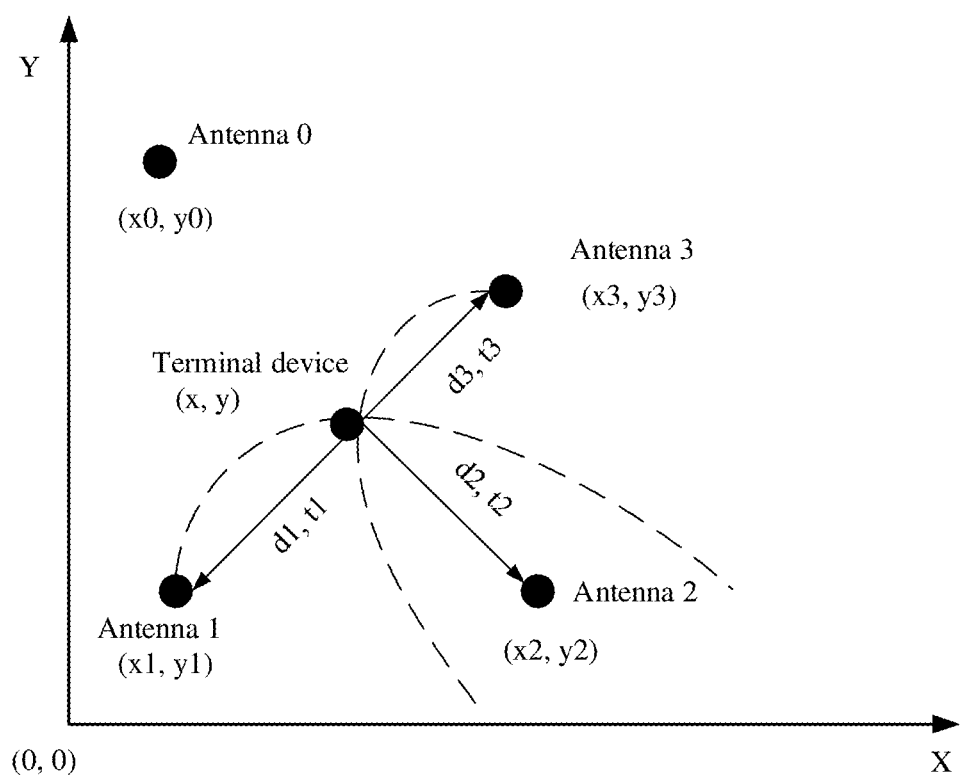
FIG. 4 is a schematic diagram of a positioning terminal device according to an embodiment of this application.

For example, it is assumed that the network device is externally connected to four external antennas: an antenna 0, an antenna 1, an antenna 2, and an antenna 3. Coordinates of the four antennas are (x0, y0), (x1, y1), (x2, y2), and (x3, y3). If the service anchor performs positioning by using a hyperbola, coordinates of at least three antennas are required. A location of the terminal device is calculated below based on locations of the antenna 1, the antenna 2, and the antenna 3. FIG. 4 is a schematic diagram of a positioning terminal device according to an embodiment of this application. As shown in FIG. 4, it is assumed that location coordinates corresponding to the terminal device are (x, y), distances between the terminal device and the antenna 1, the antenna 2, and the antenna 3 are d1, d2, and d3, and TOAs of a positioning signal on receive channels corresponding to the antenna 1, the antenna 2, and the antenna 3 are t1, t2, and t3.

In this case, the following equations can be constructed:

$$d21=\sqrt{(x-x2)^2+(y-y2)^2}-\sqrt{(x-x1)^2+(y-y1)^2}=c\times(t2-t1)$$

$$d32=\sqrt{(x-x3)^2-(y-y3)^2}-\sqrt{(x-x2)^2+(y-y2)^2}=c\times(t3-t2).$$

Herein, c represents a speed of light, d21 represents a distance between the antenna 1 and the antenna 2, and d32 represents a distance between the antenna 2 and the antenna 3. The coordinates (x, y) of the terminal device may be obtained by using the foregoing equations.

Figure 5:
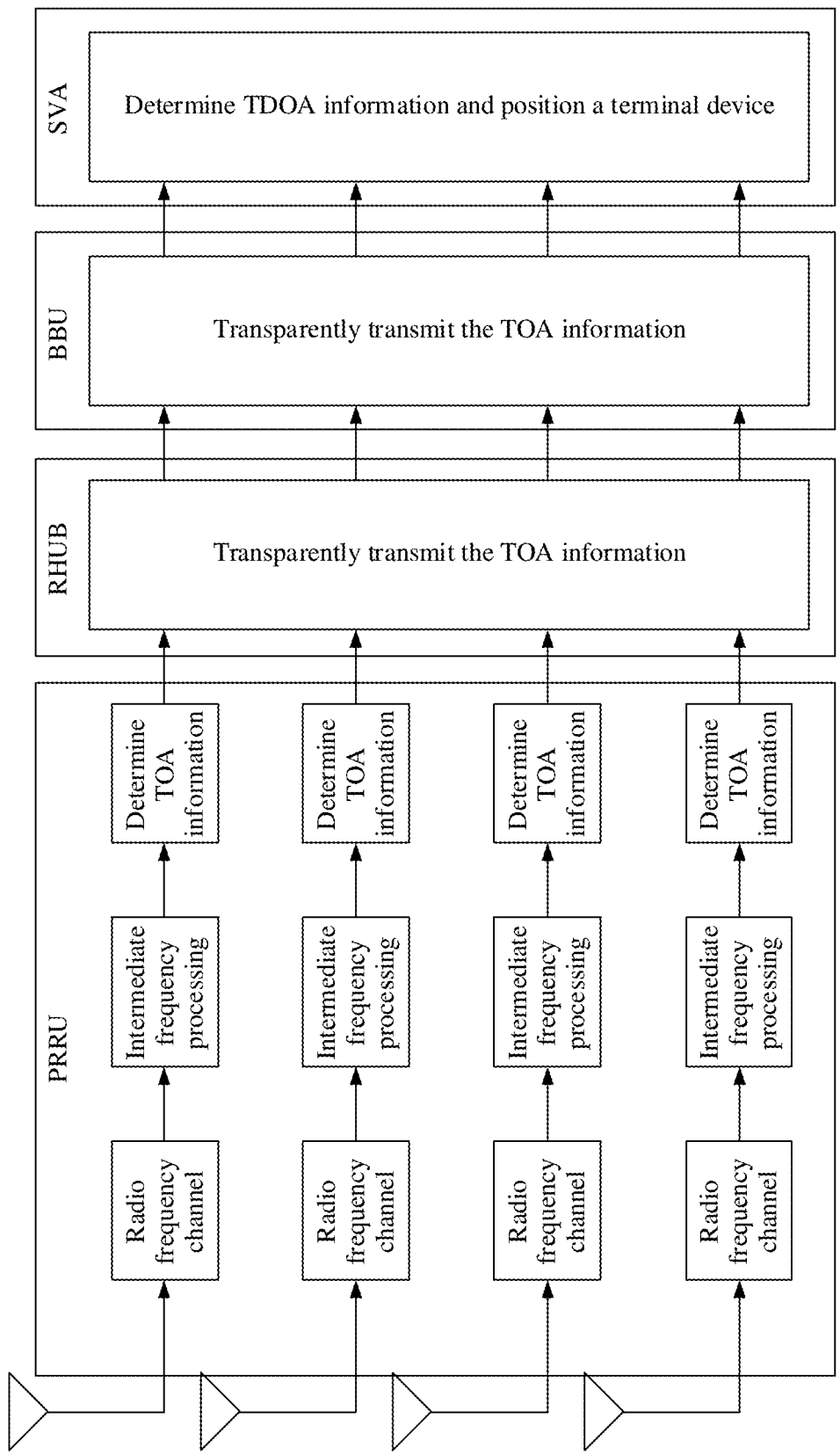
FIG. 5 is a schematic diagram of a positioning method according to an embodiment of this application.

For example, the network device may include a pico remote radio unit (Pico Remote Radio Unit, PRRU), a remote radio unit HUB (Remote Radio Unit HUB, RHUB), and a building baseband unit (Building Baseband Unite, BBU). Specifically, FIG. 5 is a schematic diagram of a positioning method according to an embodiment of this application. As shown in FIG. 5, four receive channels are respectively connected to four radio frequency channels in the PRRU, a positioning signal received from each of the receive channels corresponding to each of the four radio frequency channels is processed, and intermediate frequency processing is performed on a processed positioning signal. Then, TOA information of the positioning signal on each of the four receive channels is determined by using the foregoing super-resolution algorithm, and the TOA information is transmitted to the RHUB. The RHUB transparently transmits the TOA information to the BBU, and the BBU transparently transmits the TOA information to the SVA. The SVA determines TDOA information of the positioning signal between the N receive channels based on the TOA information, to position the terminal device.

For example, the network device may determine the RSSI information of the positioning signal on each of the N receive channels. After obtaining the RSSI information of the positioning signal on each of the N receive channels, the network device may send the RSSI information of the positioning signal on each of the N receive channels to the service anchor. The service anchor may position the terminal device through circle positioning based on the RSSI information of the positioning signal on each of the N receive channels. A specific implementation procedure is as follows: It is assumed that the network device is externally connected to four antennas: an antenna 0, an antenna 1, an antenna 2, and an antenna 3. Coordinates of the four antennas are (x0, y0), (x1, y1), (x2, y2), and (x3, y3). The service anchor requires coordinates of at least three antennas to determine a location of the terminal device. A location of the terminal device is calculated below based on locations of the antenna 0, the antenna 1, and the antenna 2. Receive channels corresponding to the antenna 0, the antenna 1, and the antenna 2 are a receive channel 0, a receive channel 1, and a receive channel 2. It is assumed that RSSI information of the positioning signal on the receive channel 0, the receive channel 1, and the receive channel 2 is RSSI_0, RSSI_1, and RSSI_2. The service anchor may calculate a distance d0 from the antenna 0 to the terminal device based on RSSI_0, calculate a distance d1 from the antenna 1 to the terminal device based on RSSI_1, and calculate a distance d2 from the antenna 2 to the terminal device based on RSSI_2. The distances d0, d1, and d2 are calculated by using a same method. That d0 is calculated is used as an example. The service anchor may calculate d0 by using a formula (3):

$$d0 = 10^{\frac{(RSSI\_0 - RSSI\_REF + 1 + AGC\_offset)}{(10 * COEFF\_ATT)}} \quad (3)$$

A unit of d0 is m, a unit of RSSI_0 is dBm, RSSI_REF is an RSSI value corresponding to the positioning signal at a specific reference distance of 10 m, AGC_offset is a link gain compensation factor of the receive channel 0, and COEF_ATT is an environment attenuation factor.

Figure 6:
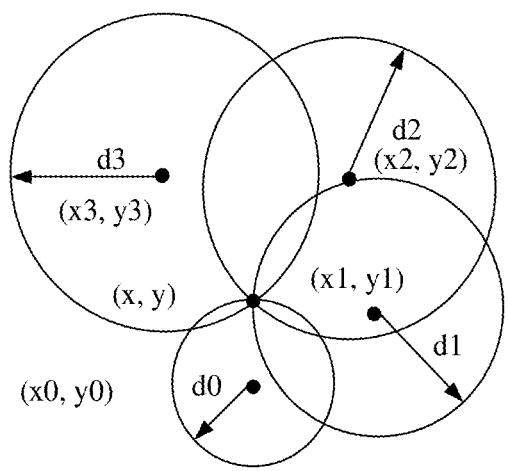
FIG. 6 is a schematic diagram of a positioning terminal device according to another embodiment of this application.

After the service anchor obtains d0, d1, and d2, the service anchor may determine the location of the terminal device based on a circle positioning algorithm. FIG. 6 is a schematic diagram of a positioning terminal device according to another embodiment of this application. As shown in FIG. 6, a service anchor may obtain coordinates (x, y) of the terminal device by solving the following equations:

$(x0-x)^2 + (y0-y)^2 = (d0)^2$ $(x1-x)^2 + (y1-y)^2 = (d1)^2$ $(x2-x)^2 + (y2-y)^2 = (d2)^2$.

In the foregoing third case, the service anchor may determine time difference of arrival TDOA information of the positioning signal between the N receive channels based on the TOA information of the positioning signal on each of the N receive channels, to position the terminal device to obtain the first positioning information; or perform circle positioning on the terminal device based on the RSSI information of the positioning signal on each of the N receive channels, to obtain the second positioning information; and determine final positioning information of the terminal device based on the first positioning information and the second positioning information. For example, the service anchor obtains an average value of the first positioning information and the second positioning information, to obtain the final positioning information. Alternatively, the service anchor uses the first positioning information or the second positioning information as the final positioning information.

In conclusion, this application provides the positioning method. The network device is externally connected to the N antennas, and the network device has the N receive channels. The network device receives, by using each of the N antennas, the positioning signal sent by the terminal device. The network device determines the time of arrival TOA information and/or the received signal strength indicator RSSI information of the positioning signal on each of the N receive channels. The network device sends the TOA information and/or the RSSI information of the positioning signal on each of the N receive channels to the service anchor. The service anchor positions the terminal device based on the TOA information and/or the RSSI information of the positioning signal on each of the N receive channels. That is, in this application, there is no need to use a plurality of network devices, but the network device is externally connected to the N antennas. Therefore, the terminal device can be positioned. This reduces costs, and adapts to most indoor scenarios, so that a multi-station joint positioning method is more widely applied.

The network device further includes N transmit channels. The N transmit channels are in a one-to-one correspondence with the N receive channels, and correspondingly, the N transmit channels are also in a one-to-one correspondence with the N antennas. Before determining the TOA information of the positioning signal on each of the N receive channels, the network device may further implement time synchronization between receive channels.

Figure 7:
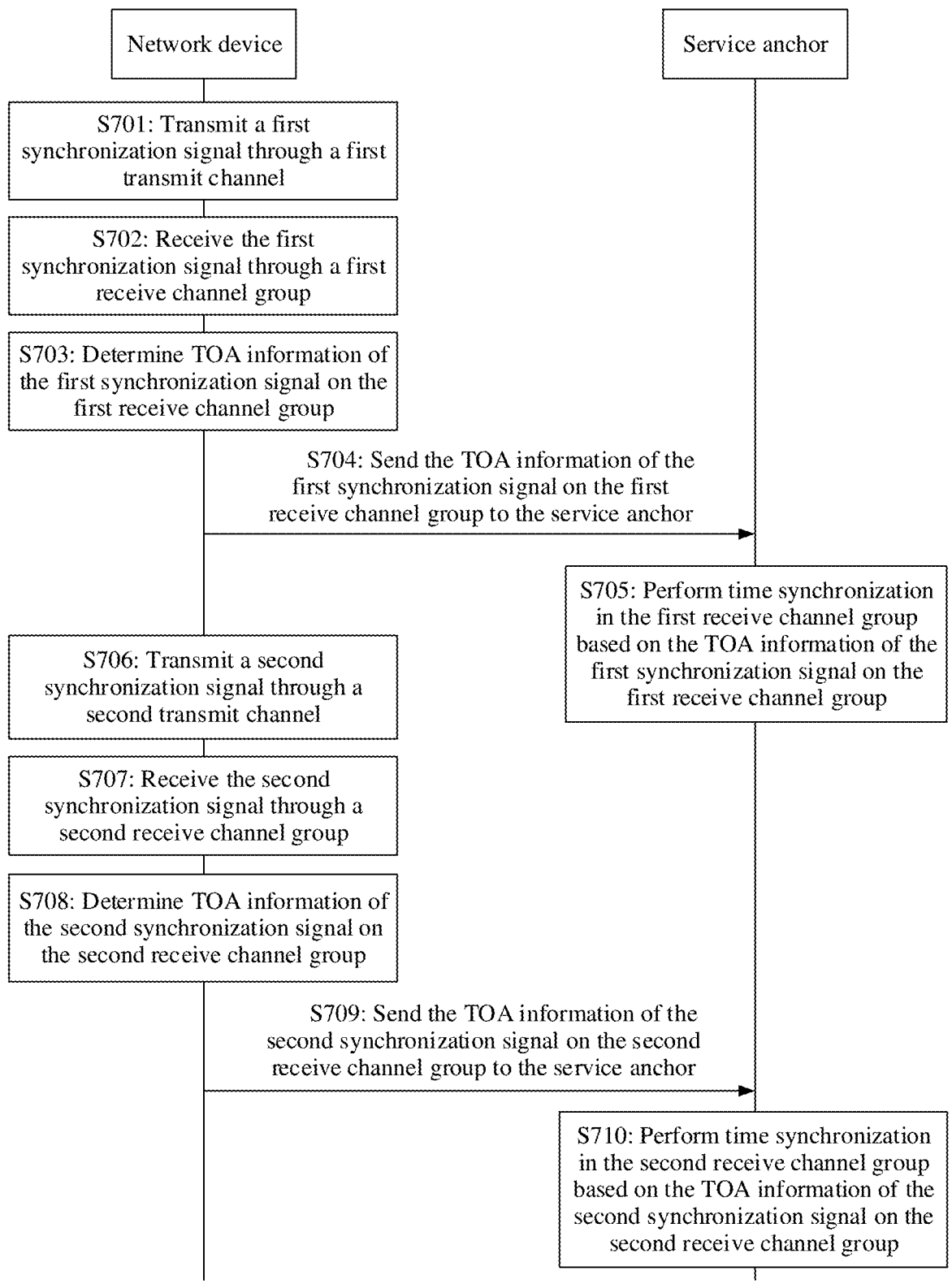
FIG. 7 is a flowchart of a method for implementing time synchronization between receive channels according to an embodiment of this application.

For example, FIG. 7 is a flowchart of a method for implementing time synchronization between receive channels according to an embodiment of this application. Network elements in the method include a network device and a service anchor. As shown in FIG. 7, the method includes the following steps.

Step S701: The network device transmits a first synchronization signal through a first transmit channel.

The first transmit channel is any one of N transmit channels.

Step S702: The network device receives the first synchronization signal through a first receive channel group.

The first receive channel group includes N−1 receive channels in N receive channels other than a receive channel corresponding to the first transmit channel.

Step S703: The network device determines TOA information of the first synchronization signal on the first receive channel group.

The TOA information of the first synchronization signal on the first receive channel group is used to implement time synchronization in the first receive channel group.

Step S704: The network device sends the TOA information of the first synchronization signal on the first receive channel group to the service anchor.

Step S705: The service anchor performs time synchronization in the first receive channel group based on the TOA information of the first synchronization signal on the first receive channel group.

Step S706: The network device transmits a second synchronization signal through a second transmit channel.

The second transmit channel is any one of the N transmit channels other than the first transmit channel.

Step S707: The network device receives the second synchronization signal through a second receive channel group.

The second receive channel group includes N−1 receive channels in the N receive channels other than a receive channel corresponding to the second transmit channel.

Step S708: The network device determines TOA information of the second synchronization signal on the second receive channel group.

Step S709: The network device sends the TOA information of the second synchronization signal on the second receive channel group to the service anchor.

The TOA information of the second synchronization signal on the second receive channel group is used to implement time synchronization in the second receive channel group.

Step S710: The service anchor performs time synchronization in the second receive channel group based on the TOA information of the second synchronization signal on the second receive channel group.

Optionally, before step S701, the service anchor may send an indication message to the network device, to indicate the network device to implement time synchronization between receive channels.

The following describes the foregoing time synchronization solution by using an example.

It is assumed that the network device sends a first synchronization signal through a transmit channel 0, and the first synchronization signal is used to implement time synchronization between a receive channel 1, a receive channel 2, and a receive channel 3. The network device may determine three pieces of TOA information of the first synchronization signal on the receive channel 1, the receive channel 2, and the receive channel 3 by using the foregoing super-resolution algorithm, which are assumed to be a TOA 01, a TOA 02, and a TOA 03 respectively. The network device sends the TOA 01, the TOA 02, and the TOA 03 to the service anchor. The service anchor calculates time synchronization compensation amounts $\Delta t12$, $\Delta t23$, and $\Delta t13$ between the receive channel 1, the receive channel 2, and the receive channel 3 in the following manner:

$$TOA01 = Tx\_0 + T01 + Rx\_1 \quad (4);$$

$$TOA02 = Tx\_0 + T02 + Rx\_2 \quad (5);$$

and $$TOA03 = Tx\_0 + T03 + Rx\_3 \quad (6).$$

Tx_0 represents a moment for sending the first synchronization signal on the transmit channel 0. T01, T02, and T03 respectively represent times corresponding to distances from the antenna 0 to the antenna 1, the antenna 2, and the antenna 3 that are converted according to radio wave propagation. For example, it is assumed that the distances from the antenna 0 to the antenna 1, the antenna 2, and the antenna 3 are respectively 12 meters, 15 meters, and 21 meters. In this case, the times corresponding to the inter-antenna distances are respectively as follows:

$$T01 = 12/3e8 = 40 \text{ ns};$$

$$T02 = 15/3e8 = 50 \text{ ns}; \text{ and}$$

$$T03 = 21/3e8 = 70 \text{ ns}.$$

According to the formulas (4), (5), and (6), the time synchronization compensation amounts $\Delta t12$, $\Delta t23$, and $\Delta t13$ between the receive channel 1, the receive channel 2, and the receive channel 3 may be calculated.

$$\begin{aligned}
\Delta t12 &= Rx\_1 - Rx\_2 \\
&= (TOA\ 01 - Tx\_0 - T01) - (TOA\ 02 - Tx\_0 - T02) \\
&= (TOA\ 01 - TOA\ 02) - (T01 - T02);
\end{aligned}$$

$$\begin{aligned}
\Delta t23 &= Rx\_2 - Rx\_3 \\
&= (TOA\ 02 - Tx\_0 - T02) - (TOA\ 03 - Tx\_0 - T03) \\
&= (TOA\ 02 - TOA\ 03) - (T02 - T03); \text{ and}
\end{aligned}$$

$$\begin{aligned}
\Delta t13 &= Rx\_1 - Rx\_3 \\
&= (TOA\ 01 - Tx\_0 - T01) - (TOA\ 03 - Tx\_0 - T03) \\
&= (TOA\ 01 - TOA\ 03) - (T01 - T03).
\end{aligned}$$

$\Delta t12$ represents the time synchronization compensation amount between the receive channel 1 and the receive channel 2.

$\Delta t23$ represents the time synchronization compensation amount between the receive channel 2 and the receive channel 3.

$\Delta t13$ represents the time synchronization compensation amount between the receive channel 1 and the receive channel 3.

It is assumed that TOA 01=110 ns, TOA 02=120 ns, and TOA 03=130 ns.

In this case, the time synchronization compensation amounts finally obtained through calculation are as follows:

$$\begin{aligned}
\Delta t12 &= Rx\_1 - Rx\_2 \\
&= (TOA\ 01 - Tx\_0 - T01) - (TOA\ 02 - Tx\_0 - T02) \\
&= (TOA\ 01 - TOA\ 02) - (T01 - T02) \\
&= (110 - 120) - (40 - 50) \\
&= -20 \text{ (ns)};
\end{aligned}$$

$$\begin{aligned}
\Delta t23 &= Rx\_2 - Rx\_3 \\
&= (TOA\ 02 - Tx\_0 - T02) - (TOA\ 03 - Tx\_0 - T03) \\
&= (TOA\ 02 - TOA\ 03) - (T02 - T03) \\
&= (120 - 130) - (50 - 70) \\
&= -30 \text{ (ns)}; \text{ and}
\end{aligned}$$

$$\begin{aligned}
\Delta t13 &= Rx\_1 - Rx\_3 \\
&= (TOA\ 01 - Tx\_0 - T01) - (TOA\ 03 - Tx\_0 - T03) \\
&= (TOA\ 01 - TOA\ 03) - (T01 - T03) \\
&= (110 - 130) - (40 - 70) \\
&= -50 \text{ (ns)}.
\end{aligned}$$

Based on this, the service anchor performs time synchronization on the receive channel 1, the receive channel 2, and the receive channel 3 based on the foregoing time synchronization compensation amounts. For example, by using a time of the receive channel 2 as a reference, a time of the receive channel 1 is compensated for by −20 (ns), and a time of the receive channel 3 is compensated for by 30 (ns).

Further, it is assumed that the network device sends a second synchronization signal through a transmit channel 1, and the second synchronization signal is used to implement time synchronization between a receive channel 0, the receive channel 2, and the receive channel 3. The network device may determine TOA information of the second synchronization signal on the receive channel 0, the receive channel 2, and the receive channel 3 by using the foregoing super-resolution algorithm, which are assumed to be a TOA 00, the TOA 02, and the TOA 03 respectively. The network device sends the TOA 00, the TOA 02, and the TOA 03 to the service anchor. The service anchor calculates time synchronization compensation amounts $\Delta t02$, $\Delta t23$, and $\Delta t03$ between the receive channel 0, the receive channel 2, and the receive channel 3 in the following manner: A method for calculating the time synchronization compensation amounts $\Delta t02$, $\Delta t23$, and $\Delta t03$ is the same as the method for calculating $\Delta t12$, $\Delta t23$, and $\Delta t13$. Details are not described again. It is assumed that a time of the receive channel 0 is also compensated for by $\Delta t02$ by using a time of the receive channel 2 as a reference, to implement time synchronization between the receive channel 0, the receive channel 1, the receive channel 2, and the receive channel 3.

It should be noted that, after the foregoing time synchronization manner is used in this application, a TOA of a positioning signal on a receive channel corresponding to each antenna is a TOA of the positioning signal on the receive channel obtained after the time synchronization.

In conclusion, in the foregoing manner, time synchronization between receive channels can be implemented, and TOA information obtained based on the foregoing manner is more accurate, thereby improving positioning accuracy of the terminal device.

Figure 8:
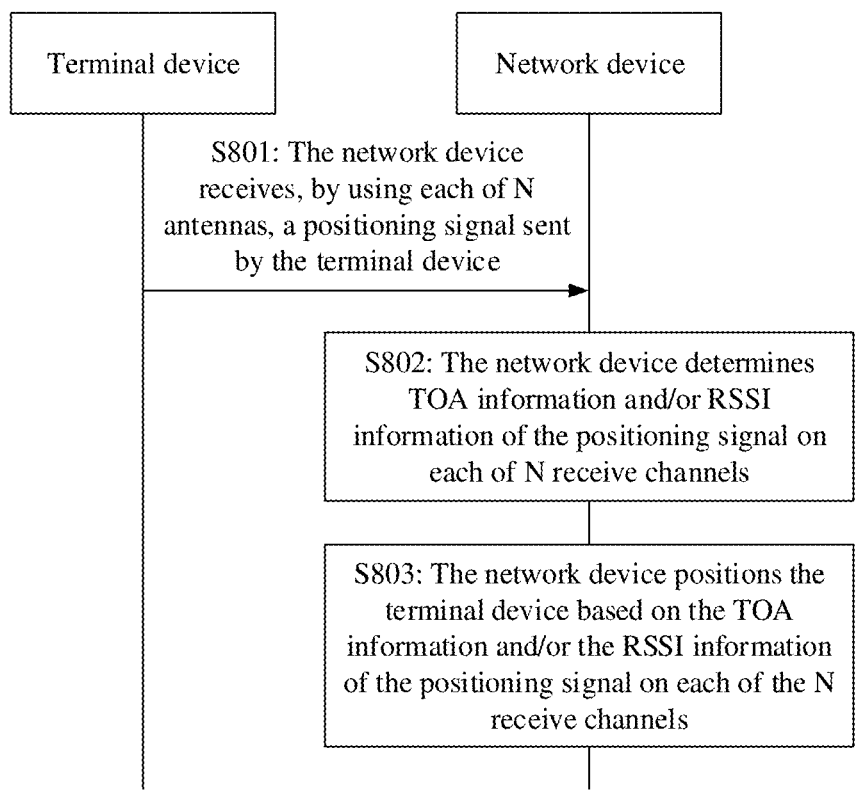
FIG. 8 is an interactive flowchart of a positioning method according to another embodiment of this application.

FIG. 8 is an interactive flowchart of a positioning method according to another embodiment of this application. Network elements in the method include a network device and a terminal device. For example, with reference to the diagram of the scenario shown in FIG. 1, the network device is externally connected to N antennas, the network device has N receive channels, the N antennas are in a one-to-one correspondence with the N receive channels, and N is an integer greater than or equal to 7. As shown in FIG. 8, the method includes the following steps.

Step S801: The network device receives, by using each of N antennas, a positioning signal sent by the terminal device.

Step S802: The network device determines time of arrival TOA information and/or received signal strength indicator RSSI information of the positioning signal on each of the N receive channels.

Step S803: The network device positions the terminal device based on the TOA information and/or the RSSI information of the positioning signal on each of the N receive channels.

For example, the network device determines time difference of arrival TDOA information of the positioning signal between the N receive channels based on the TOA information of the positioning signal on each of the N receive channels, to position the terminal device.

Alternatively, the network device performs circle positioning on the terminal device based on the RSSI information of the positioning signal on the N receive channels.

Alternatively, the network device determines time difference of arrival TDOA information of the positioning signal between the N receive channels based on the TOA information of the positioning signal on each of the N receive channels, to position the terminal device to obtain first positioning information, performs circle positioning on the terminal device based on the RSSI information of the positioning information on each of the N receive channels, to obtain second positioning information, and determines final positioning information of the terminal device based on the first positioning information and the second positioning information.

A difference between this embodiment of this application and the embodiment corresponding to FIG. 3 lies in that an action of the service anchor in FIG. 3 is implemented by the network device in this embodiment, and other content is the same as content in the embodiment corresponding to FIG. 3. For details, refer to the embodiment corresponding to FIG. 3. Details are not described herein again.

The network device further includes N transmit channels. The N transmit channels are in a one-to-one correspondence with the N receive channels, and correspondingly, the N transmit channels are also in a one-to-one correspondence with the N antennas. Before determining the TOA information of the positioning signal on each of the N receive channels, the network device may further implement time synchronization between receive channels.

Figure 9:
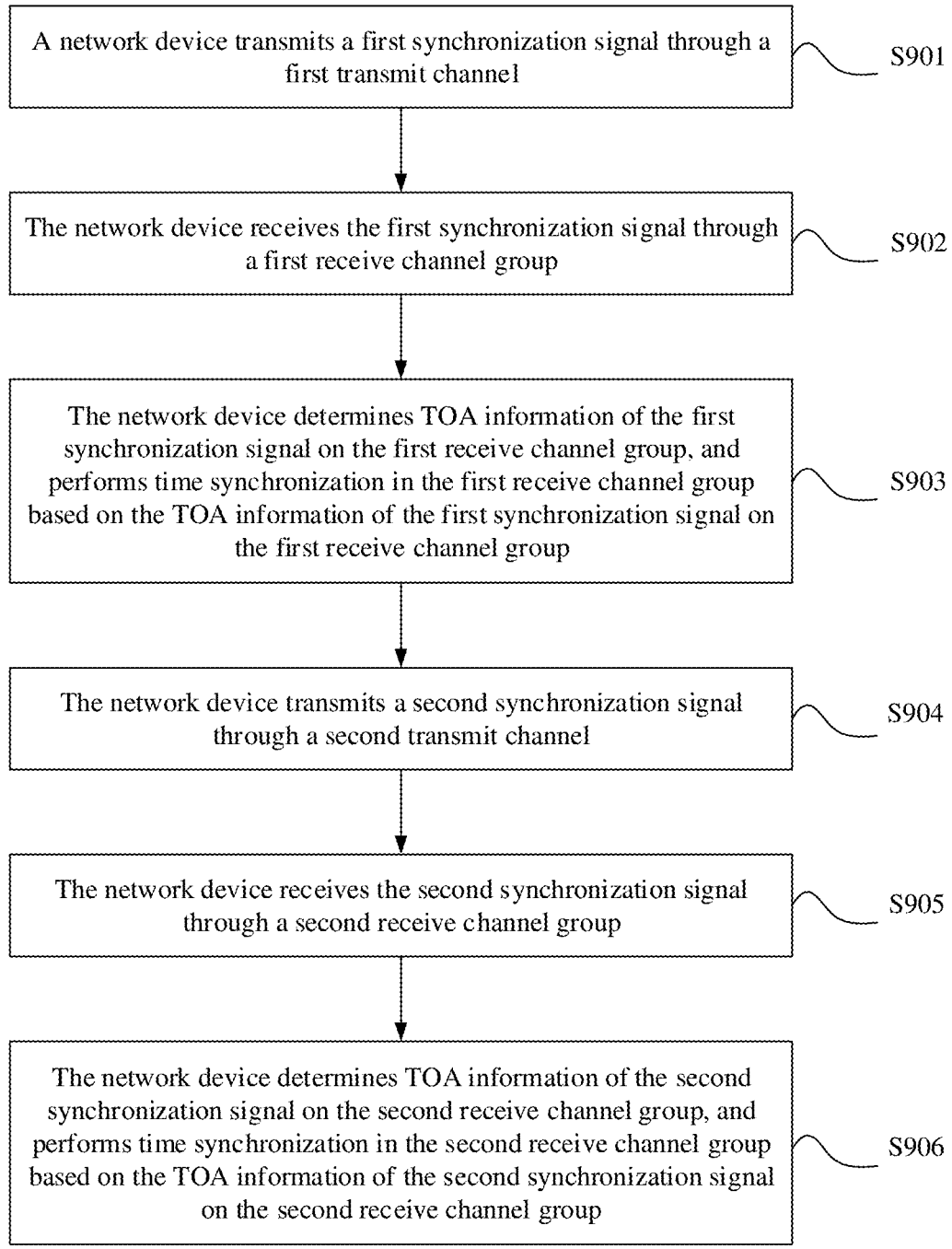
FIG. 9 is a flowchart of a method for implementing time synchronization between receive channels according to another embodiment of this application.

For example, FIG. 9 is a flowchart of a method for implementing time synchronization between receive channels according to another embodiment of this application. A network element in the method includes a network device. As shown in FIG. 9, the method includes the following steps.

Step S901: The network device transmits a first synchronization signal through a first transmit channel.

The first transmit channel is any one of N transmit channels.

Step S902: The network device receives the first synchronization signal through a first receive channel group.

The first receive channel group includes N−1 receive channels in N receive channels other than a receive channel corresponding to the first transmit channel.

Step S903: The network device determines TOA information of the first synchronization signal on the first receive channel group, and performs time synchronization in the first receive channel group based on the TOA information of the first synchronization signal on the first receive channel group.

Step S904: The network device transmits a second synchronization signal through a second transmit channel.

The second transmit channel is any one of the N transmit channels other than the first transmit channel.

Step S905: The network device receives the second synchronization signal through the second receive channel group.

The second receive channel group includes N−1 receive channels in the N receive channels other than a receive channel corresponding to the second transmit channel.

Step S906: The network device determines TOA information of the second synchronization signal on the second receive channel group, and performs time synchronization in the second receive channel group based on the TOA information of the second synchronization signal on the second receive channel group.

A difference between this embodiment of this application and the embodiment corresponding to FIG. 7 lies in that an action of the service anchor in FIG. 7 is implemented by the network device in this embodiment, and other content is the same as content in the embodiment corresponding to FIG. 7. For details, refer to the embodiment corresponding to FIG. 7. Details are not described herein again.

It should be noted that, in the foregoing embodiment, the network device is externally connected to N antennas to form multi-dimensional distributed reception, that is, to implement spatial quadrature of the positioning signal on the N receive channels. Based on this, the terminal device is positioned. Actually, the network device may further implement quadrature of the positioning signal in a time dimension, a frequency dimension, an antenna polarization dimension, or an amplitude-phase dimension, to position the terminal device.

Figure 10:
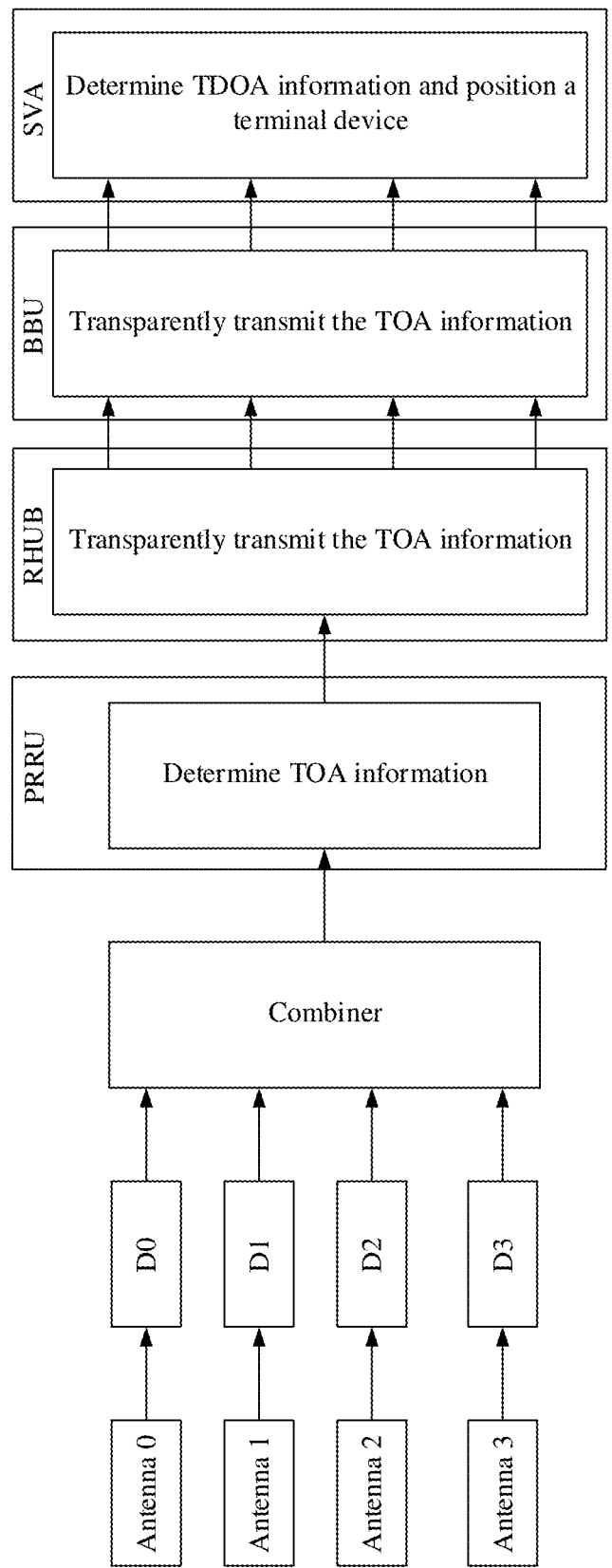
FIG. 10 is a schematic diagram of a time quadrature-based positioning method according to an embodiment of this application.

For example, FIG. 10 is a schematic diagram of a time quadrature-based positioning method according to an embodiment of this application. As shown in FIG. 10, a network device may receive, by using antennas 0 to 3, positioning signals sent by a terminal device, and perform delay processing on each positioning signal, to ensure that the network device can distinguish between the four positioning signals after combining the four positioning signals. A positioning signal finally obtained after the combination processing is transmitted to a PRRU, and the PRRU determines TOA information of each of the four positioning signals. The TOA information is transmitted to an RHUB, and the RHUB transparently transmits the TOA information to a BBU. The BBU transparently transmits the TOA information to an SVA, and the SVA determines TDOA information between the four positioning signals based on the TOA information, to position the terminal device.

A function of the SVA may also be implemented by a module or unit in the network device.

It is assumed that a delay corresponding to the positioning signal transmitted through the antenna 0 is D0, a delay corresponding to the positioning signal transmitted through the antenna 1 is D1, a delay corresponding to the positioning signal transmitted through the antenna 2 is D2, a delay corresponding to the positioning signal transmitted through the antenna 3 is D3, and a system maximum delay extension is $\tau_{max}$. In this case, when the network device performs delay processing on each positioning signal, the following conditions needs to be met:

$D0-D1 > \tau_{max}$;

$D1-D2 > \tau_{max}$; and $D2-D3 > \tau_{max}$.

It should be noted that, for a method for determining the TOA information of each of the four positioning signals, and a method for positioning the terminal device based on the TOA information of each of the four positioning signals, refer to the corresponding embodiments in FIG. 3 and FIG. 8. Details are not described herein again.

Figure 11:
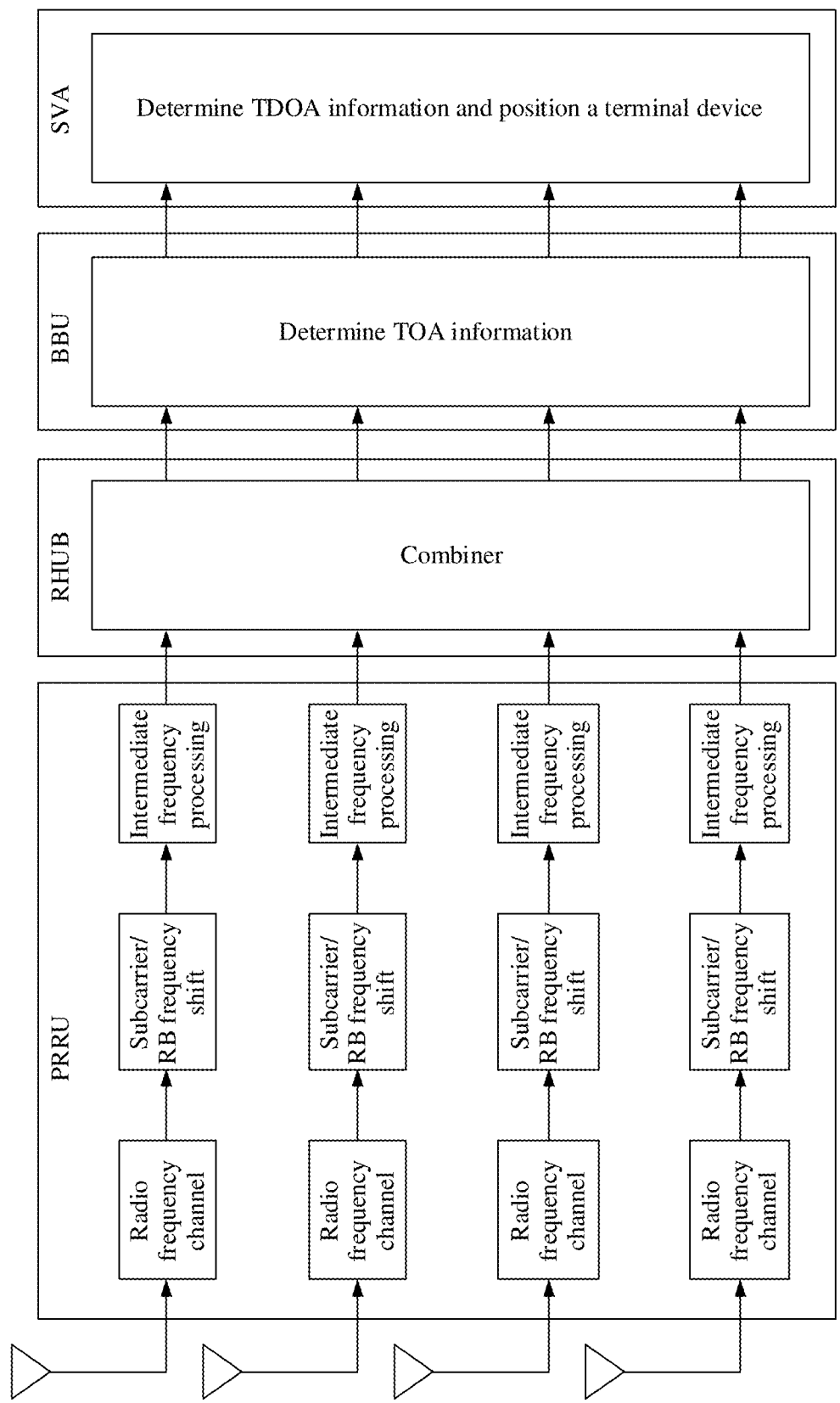
FIG. 11 is a schematic diagram of a frequency quadrature-based positioning method according to an embodiment of this application.

For another example, FIG. 11 is a schematic diagram of a frequency quadrature-based positioning method according to an embodiment of this application. As shown in FIG. 11, four receive channels are respectively connected to four radio frequency channels in a PRRU. Positioning signals received from receive channels corresponding to the four radio frequency channels are separately processed, and subcarrier or resource block (Resource Block, RB) frequency shift is performed on processed positioning signals, to ensure that a network device can distinguish between the four positioning signals after combining the four positioning signals. Then, intermediate frequency processing is performed on the positioning signals on which frequency shift is performed, and processed positioning signals are transmitted to an RHUB. The RHUB combines the four positioning signals, and transmits a combined positioning signal to a BBU. The BBU first splits the combined positioning signal in frequency domain to obtain four positioning signals, determines TOA information of the four positioning signals by using the foregoing super-resolution algorithm, and transmits the TOA information to an SVA. The SVA determines TDOA information between the four positioning signals based on the TOA information, to position a terminal device.

Figure 12:
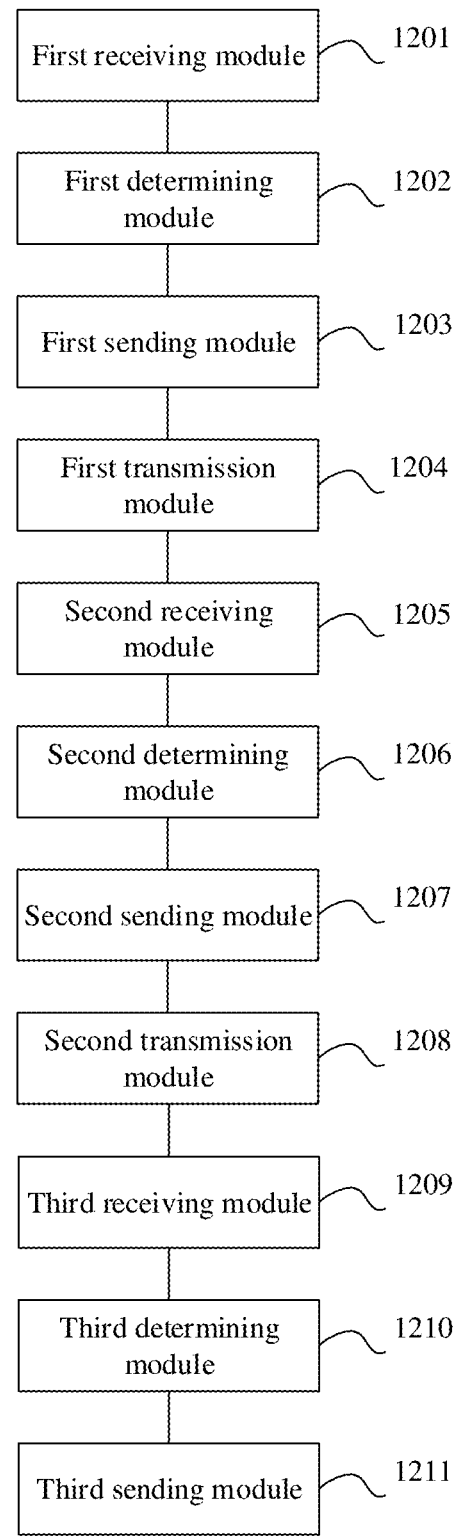
FIG. 12 is a schematic diagram of a network device according to an embodiment of this application.

FIG. 12 is a schematic diagram of a network device according to an embodiment of this application. The network device is externally connected to N antennas, the network device has N receive channels, the N antennas are in a one-to-one correspondence with the N receive channels, and N is an integer greater than or equal to 3. As shown in FIG. 12, the network device includes:

a first receiving module 1201, configured to receive, by using each of the N antennas, a positioning signal sent by a terminal device;

a first determining module 1202, configured to determine time of arrival TOA information and/or received signal strength indicator RSSI information of the positioning signal on each of the N receive channels; and a first sending module 1203, configured to send the TOA information and/or the RSSI information of the positioning signal on each of the N receive channels to a service anchor, where the TOA information and/or the RSSI information of the positioning signal on each of the N receive channels are/is used to position the terminal device.

Optionally, the network device further includes N transmit channels, the N transmit channels are in a one-to-one correspondence with the N receive channels, and the network device further includes: a first transmission module 1204, configured to transmit a first synchronization signal through a first transmit channel, where the first transmit channel is any one of the N transmit channels;

a second receiving module 1205, configured to receive the first synchronization signal through a first receive channel group, where the first receive channel group includes N−1 receive channels in the N receive channels other than a receive channel corresponding to the first transmit channel;

a second determining module 1206, configured to determine TOA information of the first synchronization signal on the first receive channel group;

a second sending module 1207, configured to send the TOA information of the first synchronization signal on the first receive channel group to the service anchor, where the TOA information of the first synchronization signal on the first receive channel group is used to implement time synchronization in the first receive channel group;

a second transmission module 1208, configured to transmit a second synchronization signal through a second transmit channel, where the second transmit channel is any one of the N transmit channels other than the first transmit channel;

a third receiving module 1209, configured to receive the second synchronization signal through a second receive channel group, where the second receive channel group includes N−1 receive channels in the N receive channels other than a receive channel corresponding to the second transmit channel;

a third determining module 1210, configured to determine TOA information of the second synchronization signal on the second receive channel group; and a third sending module 1211, configured to send the TOA information of the second synchronization signal on the second receive channel group to the service anchor, where the TOA information of the second synchronization signal on the second receive channel group is used to implement time synchronization in the second receive channel group.

The network device provided in this application may be configured to perform the foregoing positioning method performed on the network device side. For content and effects of the network device, refer to the method embodiments. Details are not described again.

Figure 13:
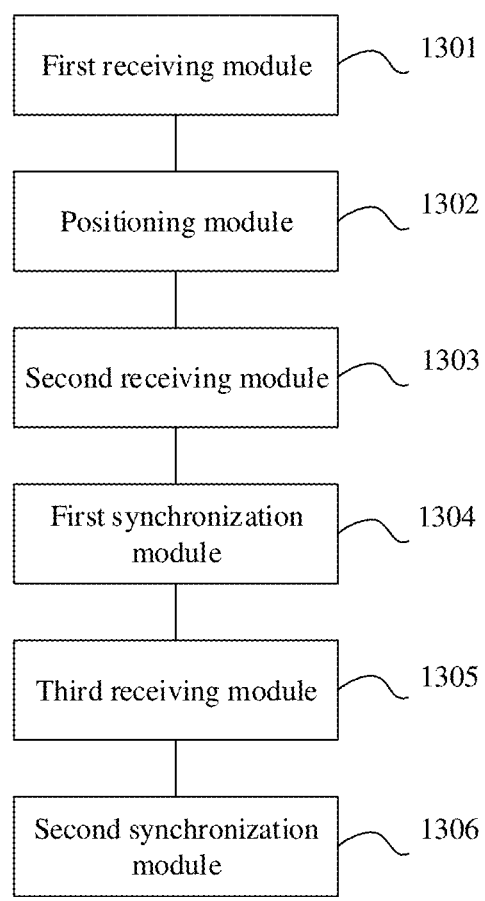
FIG. 13 is a schematic diagram of a service anchor according to an embodiment of this application.

FIG. 13 is a schematic diagram of a service anchor according to an embodiment of this application. As shown in FIG. 13, the service anchor includes:

a first receiving module 1301, configured to receive TOA information and/or RSSI information, on each of N receive channels, of a positioning signal sent by a network device; and a positioning module 1302, configured to position a terminal device based on the TOA information and/or the RSSI information of the positioning signal on each of the N receive channels, where the network device is externally connected to N antennas, the network device has N receive channels, the N antennas are in a one-to-one correspondence with the N receive channels, N is an integer greater than or equal to 3, and the positioning signal is sent by the network device by using the N antennas.

Optionally, the positioning module 1302 is specifically configured to: determine time difference of arrival TDOA information of the positioning signal between the N receive channels based on the TOA information of the positioning signal on each of the N receive channels, to position the terminal device; or perform circle positioning on the terminal device based on the RSSI information of the positioning signal on each of the N receive channels.

Optionally, the positioning module 1302 is specifically configured to: determine time difference of arrival TDOA information of the positioning signal between the N receive channels based on the TOA information of the positioning signal on each of the N receive channels, to position the terminal device to obtain first positioning information; or perform circle positioning on the terminal device based on the RSSI information of the positioning signal on each of the N receive channels, to obtain second positioning information; and determine final positioning information of the terminal device based on the first positioning information and the second positioning information.

Optionally, the service anchor further includes: a second receiving module 1303, configured to receive TOA information, on a first receive channel group, of a first synchronization signal sent by the network device, where the network device further includes N transmit channels, the N transmit channels are in a one-to-one correspondence with the N receive channels, the first synchronization signal is sent by the network device through a first transmit channel, the first transmit channel is any one of the N transmit channels, and the first receive channel group includes N−1 receive channels in the N receive channels other than a receive channel corresponding to the first transmit channel;

a first synchronization module 1304, configured to perform time synchronization in the first receive channel group based on the TOA information of the first synchronization signal on the first receive channel group;

a third receiving module 1305, configured to receive TOA information, on a second receive channel group, of a second synchronization signal sent by the network device, where the second synchronization signal is sent by the network device through a second transmit channel, the second transmit channel is any one of the N transmit channels other than the first transmit channel, and the second receive channel group includes N−1 receive channels in the N receive channels other than a receive channel corresponding to the second transmit channel; and a second synchronization module 1306, configured to perform time synchronization in the second receive channel group based on the TOA information of the second synchronization signal on the second receive channel group.

The service anchor provided in this application may be configured to perform the foregoing positioning method performed on the service anchor side. For content and effects of the service anchor, refer to the method embodiments. Details are not described again.

Figure 14:
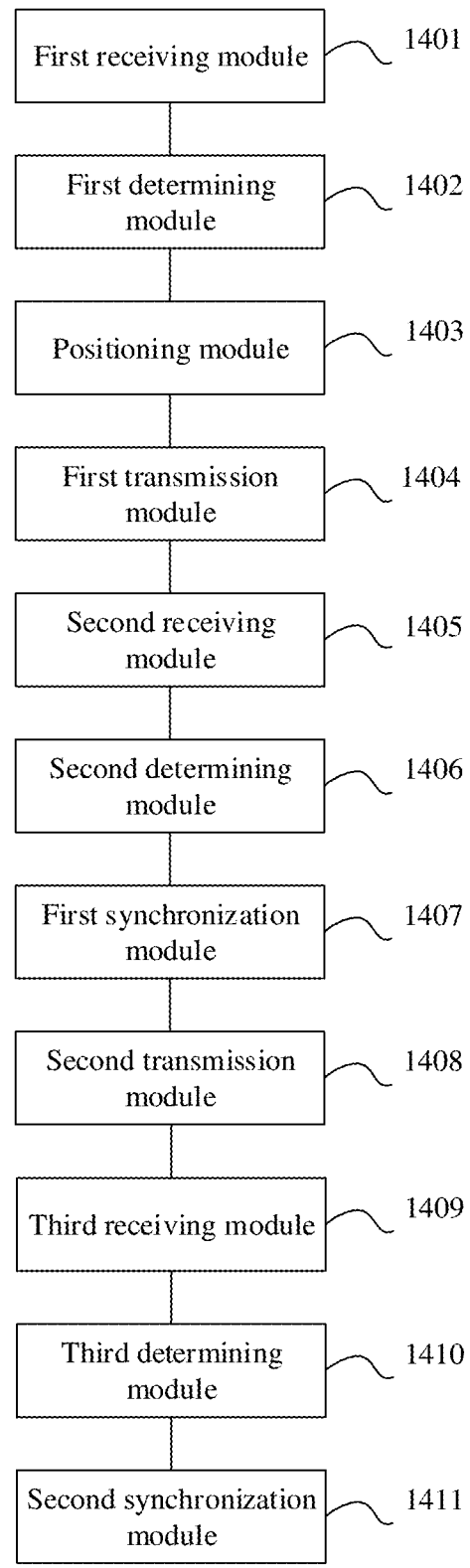
FIG. 14 is a schematic diagram of a network device according to another embodiment of this application.

FIG. 14 is a schematic diagram of a network device according to another embodiment of this application. The network device is externally connected to N antennas, the network device has N receive channels, the N antennas are in a one-to-one correspondence with the N receive channels, and N is an integer greater than or equal to 3. As shown in FIG. 14, the network device includes:

a first receiving module 1401, configured to receive, by using each of the N antennas, a positioning signal sent by a terminal device;

a first determining module 1402, configured to determine time of arrival TOA information and/or received signal strength indicator RSSI information of the positioning signal on each of the N receive channels; and a positioning module 1403, configured to position the terminal device based on the TOA information and/or the RSSI information of the positioning signal on each of the N receive channels.

Optionally, the network device further includes N transmit channels, the N transmit channels are in a one-to-one correspondence with the N receive channels, and the network device further includes:

a first transmission module 1404, configured to transmit a first synchronization signal through a first transmit channel, where the first transmit channel is any one of the N transmit channels;

a second receiving module 1405, configured to receive the first synchronization signal through a first receive channel group, where the first receive channel group includes N−1 receive channels in the N receive channels other than a receive channel corresponding to the first transmit channel;

a second determining module 1406, configured to determine TOA information of the first synchronization signal on the first receive channel group;

a first synchronization module 1407, configured to perform time synchronization in the first receive channel group based on the TOA information of the first synchronization signal on the first receive channel group;

a second transmission module 1408, configured to transmit a second synchronization signal through a second transmit channel, where the second transmit channel is any one of the N transmit channels other than the first transmit channel;

a third receiving module 1409, configured to receive the second synchronization signal through a second receive channel group, where the second receive channel group includes N−1 receive channels in the N receive channels other than a receive channel corresponding to the second transmit channel;

a third determining module 1410, configured to determine TOA information of the second synchronization signal on the second receive channel group; and a second synchronization module 1411, configured to perform time synchronization in the second receive channel group based on the TOA information of the second synchronization signal on the second receive channel group.

Optionally, the positioning module 1403 is specifically configured to: determine time difference of arrival TDOA information of the positioning signal between the N receive channels based on the TOA information of the positioning signal on each of the N receive channels, to position the terminal device; or perform circle positioning on the terminal device based on the RSSI information of the positioning signal on each of the N receive channels.

Optionally, the positioning module 1403 is specifically configured to: determine time difference of arrival TDOA information of the positioning signal between the N receive channels based on the TOA information of the positioning signal on each of the N receive channels, to position the terminal device to obtain first positioning information; or perform circle positioning on the terminal device based on the RSSI information of the positioning signal on each of the N receive channels, to obtain second positioning information; and determine final positioning information of the terminal device based on the first positioning information and the second positioning information.

The network device provided in this application may be configured to perform the foregoing positioning method performed on the network device side. For content and effects of the network device, refer to the method embodiments. Details are not described again.

Figure 15:
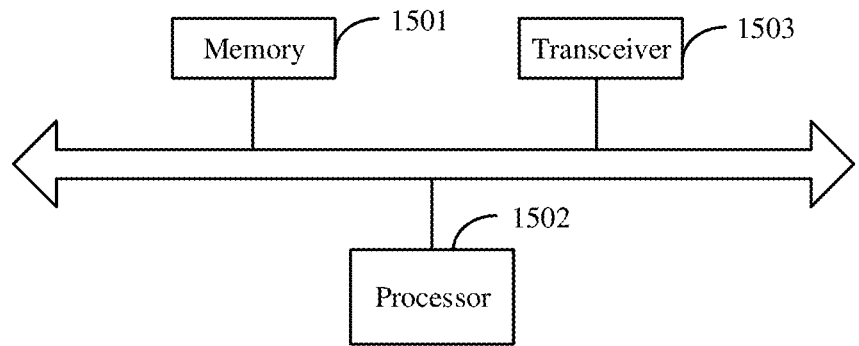
FIG. 15 is a schematic diagram of a network device according to an embodiment of this application.

FIG. 15 is a schematic diagram of a network device according to an embodiment of this application. As shown in FIG. 15, the network device includes a memory 1501 and a processor 1502. The memory is configured to store computer instructions, so that the processor executes the computer instructions, to implement the positioning method performed by the network device. For content and effects of the network device, refer to the method embodiments. Details are not described again. Optionally, the network device further includes a transceiver 1503, configured to implement data transmission with another device.

For example, the processor 1502 may be a processing unit that is in the foregoing PRRU and that is configured to determine TOA information and/or RSSI information.

The network device provided in this application may be configured to perform the foregoing positioning method performed on the network device side. For content and effects of the network device, refer to the method embodiments. Details are not described again.

Figure 16:
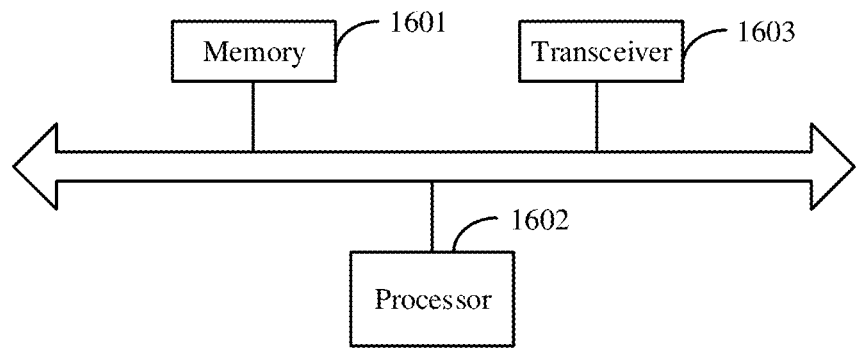
FIG. 16 is a schematic diagram of a service anchor according to an embodiment of this application.

FIG. 16 is a schematic diagram of a service anchor according to an embodiment of this application. As shown in FIG. 16, the service anchor includes a memory 1601 and a processor 1602. The memory is configured to store computer instructions, so that the processor 1602 executes the computer instructions, to implement the positioning method performed by the service anchor. For content and effects of the service anchor, refer to the method embodiments. Details are not described again. Optionally, the service anchor further includes a transceiver 1603, configured to implement data transmission with another device.

The network device provided in this application may be configured to perform the foregoing positioning method performed on the service anchor side. For content and effects of the service anchor, refer to the method embodiments. Details are not described again.

Figure 17:
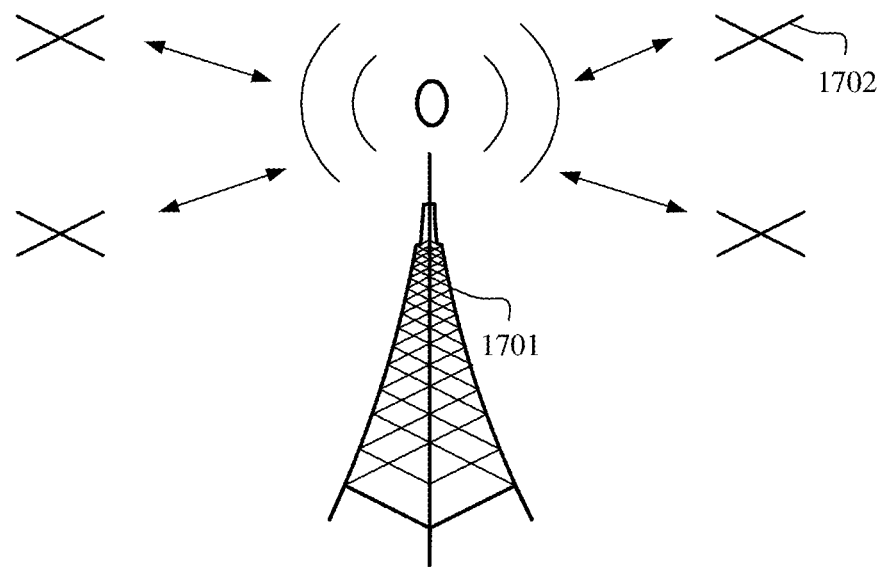
FIG. 17 is a schematic diagram of a positioning system according to an embodiment of this application.

FIG. 17 is a schematic diagram of a positioning system according to an embodiment of this application. As shown in FIG. 17, the positioning system includes a network device 1701 and N antennas externally connected to a network device 1702, where N is an integer greater than or equal to 3. Optionally, the system further includes the foregoing service anchor.

The network device or the network device and the service anchor in the positioning system provided in this application may be configured to perform the foregoing positioning method. For content and effects of the network device or the network device and the service anchor, refer to the method embodiments. Details are not described again.

This application provides a chip, and the chip is configured to implement the positioning method performed by the network device. For content and effects of the chip, refer to the method embodiments. Details are not described herein again.

This application provides a computer storage medium, including: computer executable instructions. The computer executable instructions are used to implement a positioning method performed by the terminal device. For content and effects of the computer storage medium, refer to the method embodiments. Details are not described herein again.

What is claimed is:

1. A network device, wherein the network device is externally connected to N antennas, the network device has N receive channels, the N antennas are in a one-to-one correspondence with the N receive channels, N is an integer greater than or equal to 3, and the network device comprises a transceiver and a processor;

the transceiver is configured to receive, by using each of the N antennas, a positioning signal sent by a terminal device;

the processor is configured to determine at least one of time of arrival (TOA) information or received signal strength indicator (RSSI) information of the positioning signal on each of the N receive channels; and the transceiver is configured to send the at least one of the TOA information or the RSSI information of the positioning signal on each of the N receive channels to a service anchor, to enable the service anchor to position the terminal device based on the at least one of the TOA information or the RSSI information of the positioning signal on each of the N receive channels, wherein the network device further comprises N transmit channels, the N transmit channels are in a one-to-one correspondence with the N receive channels;

the transceiver is configured to transmit a first synchronization signal through a first transmit channel, wherein the first transmit channel is any one of the N transmit channels;

the transceiver is configured to receive the first synchronization signal through a first receive channel group, wherein the first receive channel group comprises N−1 receive channels in the N receive channels other than a first receive channel corresponding to the first transmit channel;

the processor is configured to determine first TOA information of the first synchronization signal on the first receive channel group; and the transceiver is configured to send the first TOA information of the first synchronization signal on the first receive channel group to the service anchor, to enable the service anchor to implement time synchronization in the first receive channel group based on the first TOA information of the first synchronization signal on the first receive channel group.

2. The network device according to claim 1, wherein the transceiver is configured to transmit a second synchronization signal through a second transmit channel, wherein the second transmit channel is any one of the N transmit channels other than the first transmit channel;

the transceiver is configured to receive the second synchronization signal through a second receive channel group, wherein the second receive channel group comprises N−1 receive channels in the N receive channels other than a second receive channel corresponding to the second transmit channel;

the processor is configured to determine second TOA information of the second synchronization signal on the second receive channel group; and the transceiver is configured to send the second TOA information of the second synchronization signal on the second receive channel group to the service anchor, to enable the service anchor to implement time synchronization in the second receive channel group based on the second TOA information of the second synchronization signal on the second receive channel group.

3. A service anchor, comprising:

a transceiver configured to receive, from a network device, at least one of time of arrival (TOA) information or received signal strength indicator (RSSI) information, on each of N receive channels, of a positioning signal sent by a terminal device and received by the network device; and a processor configured to position the terminal device based on the at least one of the TOA information or the RSSI information of the positioning signal on each of the N receive channels, wherein the network device is externally connected to N antennas, the network device has the N receive channels, the N antennas are in a one-to-one correspondence with the N receive channels, N is an integer greater than or equal to 3, and the positioning signal is received by the network device by using the N antennas;

the transceiver is configured to receive first TOA information, on a first receive channel group, of a first synchronization signal sent by the network device, wherein the network device further comprises N transmit channels, the N transmit channels are in a one-to-one correspondence with the N receive channels, the first synchronization signal is sent by the network device through a first transmit channel, the first transmit channel is any one of the N transmit channels, and the first receive channel group comprises N−1 receive channels in the N receive channels other than a first receive channel corresponding to the first transmit channel; and the processor is configured to perform time synchronization in the first receive channel group based on the first TOA information of the first synchronization signal on the first receive channel group.

4. The service anchor according to claim 3, wherein the processor is configured to:

determine time difference of arrival (TDOA) information of the positioning signal between the N receive channels based on the TOA information of the positioning signal on each of the N receive channels, to position the terminal device; or perform circle positioning on the terminal device based on the RSSI information of the positioning signal on each of the N receive channels.

5. The service anchor according to claim 3, wherein the processor is configured to:

determine time difference of arrival (TDOA) information of the positioning signal between the N receive channels based on the TOA information of the positioning signal on each of the N receive channels, to obtain first positioning information of the terminal device;

perform circle positioning on the terminal device based on the RSSI information of the positioning signal on each of the N receive channels, to obtain second positioning information of the terminal device; and determine final positioning information of the terminal device based on the first positioning information and the second positioning information.

6. The service anchor according to claim 3, wherein the transceiver is configured to receive second TOA information, on a second receive channel group, of a second synchronization signal sent by the network device, wherein the second synchronization signal is sent by the network device through a second transmit channel, the second transmit channel is any one of the N transmit channels other than the first transmit channel, and the second receive channel group comprises N−1 receive channels in the N receive channels other than a second receive channel corresponding to the second transmit channel; and the processor is configured to perform time synchronization in the second receive channel group based on the second TOA information of the second synchronization signal on the second receive channel group.

7. A network device, wherein the network device is externally connected to N antennas, the network device has N receive channels, the N antennas are in a one-to-one correspondence with the N receive channels, N is an integer greater than or equal to 3, and the network device comprises a transceiver and a processor;

the transceiver is configured to receive, by using each of the N antennas, a positioning signal sent by a terminal device;

the processor is configured to perform, on the positioning signal received by the transceiver on each of the N receive channels, at least one of a delay processing, or a subcarrier or resource block (RB) frequency shift;

after performing said at least one of the delay processing or the frequency shift, determine at least one of time of arrival (TOA) information or received signal strength indicator (RSSI) information of the positioning signal on each of the N receive channels; and position the terminal device based on the at least one of the TOA information or the RSSI information of the positioning signal on each of the N receive channels;

the network device further comprises N transmit channels, the N transmit channels are in a one-to-one correspondence with the N receive channels;

the transceiver is configured to transmit a first synchronization signal through a first transmit channel, wherein the first transmit channel is any one of the N transmit channels;

the transceiver is configured to receive the first synchronization signal through a first receive channel group, wherein the first receive channel group comprises N−1 receive channels in the N receive channels other than a first receive channel corresponding to the first transmit channel; and the processor is configured to determine first TOA information of the first synchronization signal on the first receive channel group; and perform time synchronization in the first receive channel group based on the first TOA information of the first synchronization signal on the first receive channel group.

8. The network device according to claim 7, wherein the processor is configured to:
determine time difference of arrival (TDOA) information of the positioning signal between the N receive channels based on the TOA information of the positioning signal on each of the N receive channels, to position the terminal device; or
perform circle positioning on the terminal device based on the RSSI information of the positioning signal on each of the N receive channels.

9. The network device according to claim 7, wherein the processor is configured to:
determine time difference of arrival (TDOA) information of the positioning signal between the N receive channels based on the TOA information of the positioning signal on each of the N receive channels, to obtain first positioning information of the terminal device;
perform circle positioning on the terminal device based on the RSSI information of the positioning signal on each of the N receive channels, to obtain second positioning information of the terminal device; and
determine final positioning information of the terminal device based on the first positioning information and the second positioning information.

10. The network device according to claim 7, wherein
the transceiver is configured to transmit a second synchronization signal through a second transmit channel, wherein the second transmit channel is any one of the N transmit channels other than the first transmit channel;
the transceiver is configured to receive the second synchronization signal through a second receive channel group, wherein the second receive channel group comprises N−1 receive channels in the N receive channels other than a second receive channel corresponding to the second transmit channel; and
the processor is configured to
determine second TOA information of the second synchronization signal on the second receive channel group; and
perform time synchronization in the second receive channel group based on the second TOA information of the second synchronization signal on the second receive channel group.

\* \* \* \* \*